United States Patent [19]

Rickard et al.

[11] Patent Number: 5,845,327
[45] Date of Patent: Dec. 1, 1998

[54] CACHE COHERENCY WHERE MULTIPLE PROCESSORS MAY ACCESS THE SAME DATA OVER INDEPENDENT ACCESS PATHS

[75] Inventors: Jay B. Rickard, San Jose; Farid Yazdy, Belmont; Dale Adams, San Jose, all of Calif.

[73] Assignee: Apple Computer, Inc., Cupertino, Calif.

[21] Appl. No.: 823,839

[22] Filed: Mar. 25, 1997

Related U.S. Application Data

[63] Continuation of Ser. No. 433,150, May 3, 1995, abandoned.

[51] Int. Cl.$^6$ .............................. G06F 12/08; G06F 13/16
[52] U.S. Cl. ........................................... 711/146; 395/308
[58] Field of Search .................................... 711/118, 119, 711/121, 122, 124, 146, 147, 150; 395/308, 503, 512

[56] References Cited

U.S. PATENT DOCUMENTS

| | | | |
|---|---|---|---|
| 3,581,291 | 5/1971 | Iwamoto et al. | 711/147 |
| 4,164,787 | 8/1979 | Aranguren | 711/147 |
| 5,046,023 | 9/1991 | Katsura et al. | 345/434 |
| 5,072,369 | 12/1991 | Theus et al. | 711/146 |
| 5,222,224 | 6/1993 | Flynn et al. | 711/144 |
| 5,465,058 | 11/1995 | Krenik et al. | 326/83 |
| 5,511,224 | 4/1996 | Tran et al. | 395/308 |
| 5,625,829 | 4/1997 | Gephardt et al. | 395/284 |

OTHER PUBLICATIONS

Handy "The Cache Memory Book", 1993, pp. 5–8, 126–137.

*Primary Examiner*—Eddie P. Chan
*Assistant Examiner*—Kevin L Ellis
*Attorney, Agent, or Firm*—Burns, Doane, Swecker & Mathis, L.L.P.

[57] ABSTRACT

The present invention, generally speaking, provides a hardware graphics accelerator for use in a computer system having a data processor, a system bus, and a memory subsystem including both main memory and video memory. The hardware graphics accelerator includes a datapath controller connected to the system bus and to the memory subsystem for receiving data from the memory subsystem, performing an operation upon the data, and returning the data to the memory subsystem; and a memory controller connected to the system bus, to the datapath controller, and to the memory subsystem for controlling the memory subsystem such that at one time the datapath controller receives the data from the main memory and at another time the datapath controller receives the data from the video memory. In accordance with a further aspect of the invention, the hardware graphics accelerator includes circuitry for maintaining cache coherency when the system includes either a level-one cache only or both a level-one and a level-two cache.

7 Claims, 13 Drawing Sheets

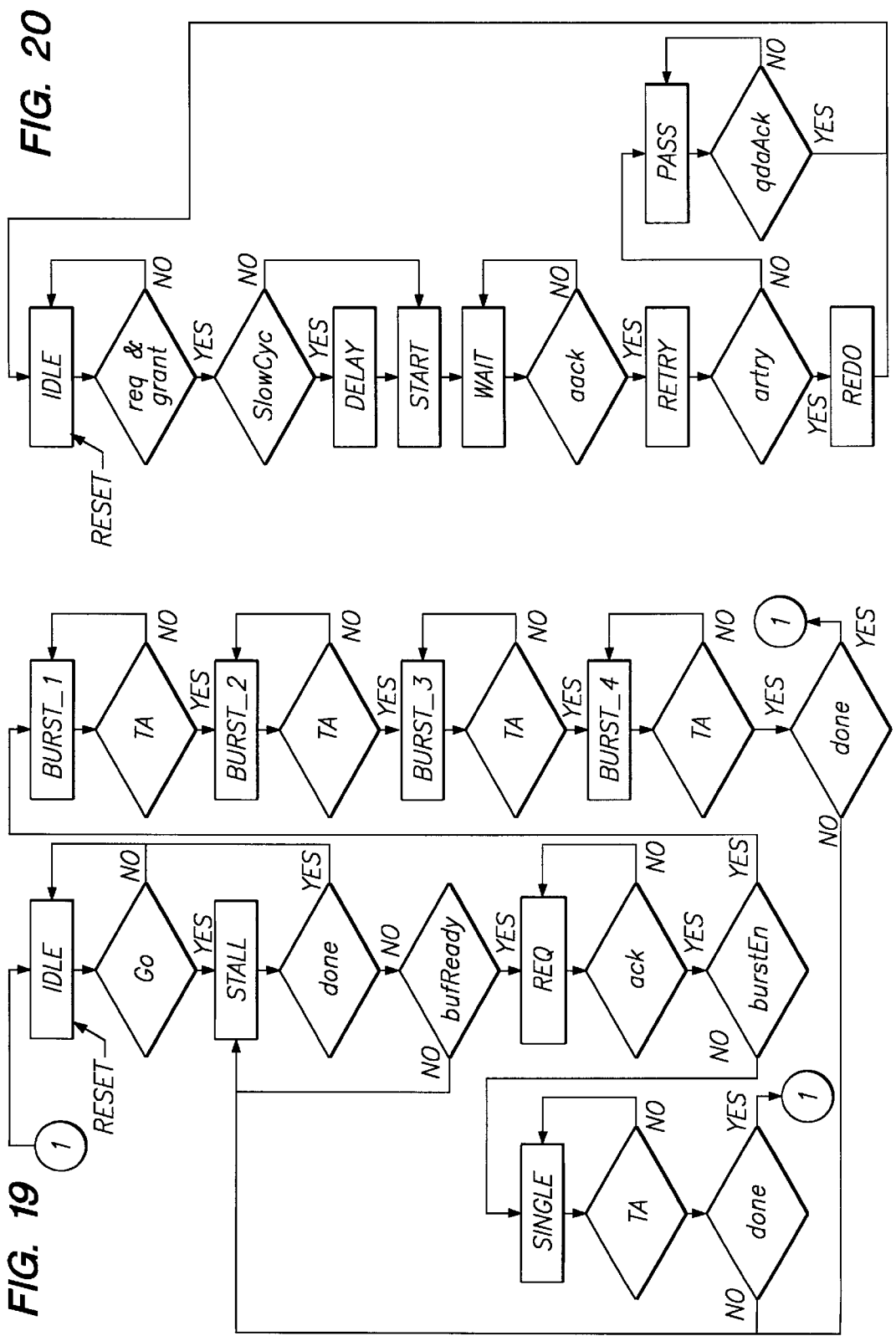

CACHE COHERENCY WHERE MULTIPLE PROCESSORS MAY ACCESS THE SAME DATA OVER INDEPENDENT ACCESS PATHS

This application is a continuation of application Ser. No. 08/433,150, filed May 3, 1995, now abandoned.

BACKGROUND OF THE INVENTION

1. Field of the Invention

The present invention relates to cache coherency in a computer system having multiple processing devices, in particular a system having a hardware graphics accelerator or other accelerator device.

2. State of the Art

The relative complexity of rendering a graphical image, whether on a computer display or on a printed page, has resulted in the development of a number of different graphical "languages". Some of these languages, for example Printer Control Language (PCL), are primarily applicable to producing hard copy. Other "page description" languages are applicable to both displaying images on a computer screen and printing images on print media. For example, in a Macintosh computer, a graphics library known as "QuickDraw", part of the Macintosh Operating System, may be used to produce images on screen or off screen. Similarly, in PC-compatible computers, the Windows operating system provides drawing routines in the form of a Graphics Device Interface library which is used for imaging all complex graphic operations either on or off screen. For purposes of describing the present invention, reference will be made to QuickDraw; it should be understood, however, that the invention is and will be applicable to a wide variety of graphical languages.

QuickDraw converts graphics commands from a higher-level application program for presentation on a video screen or for printing on print media. QuickDraw provides a graphics library built into every Macintosh computer, and is described more fully in *INSIDE MACINTOSH, Imaging With QuickDraw*, Addison Wesley, 1994, which is incorporated herein by reference.

QuickDraw defines some clear mathematical constructs that are widely used in its procedures, functions and data types. The most basic QuickDraw type is the point which consists of two integers for specifying a horizontal and vertical position in a coordinate plane. Other types are lines, rectangles, ovals, arcs, rounded-corner rectangles, polygons, and regions. Many drawing operations consist of filling or framing these objects with a pattern. QuickDraw also supports drawing text in multiple fonts in various sizes and styles. In present day computers, QuickDraw draws by altering a bit image in an area of memory, the frame buffer in the case of screen display and the print buffer in the case of printed output.

QuickDraw allows a number of separate drawing areas called GrafPorts to be defined. Each GrafPort has its own complete drawing environment that defines how and where graphic operations will have their effect. Many GrafPorts can be open at once and each one will have its own coordinate system, drawing pattern, background pattern, pen size and location, character font and style, etc. GrafPorts are fundamental to the Macintosh's overlapping window user interface. One GrafPort may be designated as the printer GrafPort in order to draw a page for printing.

Each GrafPort has a rectangle, called the portRect, which defines the area for use by the GrafPort. Each GratPort also has its own clipping region which can be used to further limit drawing to any subset of the GrafPorts's portRect. Each GrafPort has a drawing pen which is used for drawing lines, shapes, and text. The pen has four characteristics: a location, a size, a drawing mode, and a drawing pattern. The pen mode and pen pattern determine how the bits "under" the pen are affected as the pen "moves over" them when drawing lines and shapes. Each GrafPort also has its own text font, style, mode and size for drawing text within the GrafPort.

There are five different drawing operations for drawing different image shapes, namely, frame, paint, erase, invert and fill. Each of the shape-drawing operations can be applied to rectangles, regions, ovals arcs, rounded-corner rectangles and polygons. In addition, QuickDraw provides routines to draw text and to perform bit-copy operations.

For each shape that QuickDraw can produce, there are separate procedures that perform the basic graphic operations to produce that shape: frame, paint, erase, invert and fill. Each of these procedures in turn calls a low-level internal QuickDraw routine for the shape to actually perform the drawing. For example, The FrameOval, PaintOval, EraseOval, InvertOval and FillOval procedures in QuickDraw actually call a single low-level routine within QuickDraw which performs these operations on ovals. There are also low-level procedures for drawing text, lines, and for performing bitcopy operations. Low-level routines are also called bottleneck procedures, which may be regarded as graphics primitives. The main QuickDraw bottleneck procedures are: StdText, StdLine, StdBits, StdRect, StdRRect, StdOval, StdPoly and StdRgn.

In the past, QuickDraw routines have been implemented in software. As a result, the computer's CPU has been burden by the need to handle large volumes of display data and print data.

Hardware graphics accelerators are well-known and are widely-available for computers running the Windows operating system. Accelerator boards are also available for computers running under the Macintosh operating system. Such boards, although they may off-load certain task, possibly including graphics tasks, from the motherboard CPU, nevertheless execute those graphics tasks in software. There has not been available a hardware graphics accelerator for computers running under the Macintosh operating system, i.e., a QuickDraw graphics accelerator.

Furthermore, in known hardware graphics accelerators, the hardware graphics accelerator has access only to data stored in the computer's frame buffer, composed of (at least in higher-performance computers) video random access memory, or VRAM. The hardware graphics accelerator has not had access to data stored in the computer's main memory, composed of (typically) dynamic random access memory, or DRAM. In many instances, a graphic object is located in DRAM and is to be manipulated using graphic routines. In accordance with the prior art, the CPU must then intervene to transfer the graphic object from DRAM to VRAM in order for the hardware graphics accelerator to be able to access the data.

Moreover, conventional hardware graphics accelerators, since they deal only with VRAM, which is never cached, do not have facilities for dealing with cacheable data so as to maintain cache coherency.

SUMMARY OF THE INVENTION

The present invention, generally speaking, provides a hardware graphics accelerator for use in a computer system having a data processor, a system bus, and a memory subsystem including both main memory and video memory. The hardware graphics accelerator includes a datapath controller connected to the system bus and to the memory subsystem for receiving data from the memory subsystem, performing an operation upon the data, and returning the data to the memory subsystem; and a memory controller connected to the system bus, to the datapath controller, and to the memory subsystem for controlling the memory subsystem such that at one time the datapath controller receives the data from the main memory and at another time the datapath controller receives the data from the video memory. In accordance with a further aspect of the invention, the hardware graphics accelerator includes circuitry for maintaining cache coherency when the system includes either a level-one cache only or both a level-one and a level-two cache.

BRIEF DESCRIPTION OF THE DRAWING

The present invention may be further understood from the following description in conjunction with the appended drawing. In the drawing:

FIG. 19 is a state diagram of a memory address state machine 1603 of FIG. 16;

FIG. 20 is a state diagram of a bus master state machine 1601 of FIG. 16;

DETAILED DESCRIPTION OF THE PREFERRED EMBODIMENTS

Figure 1:
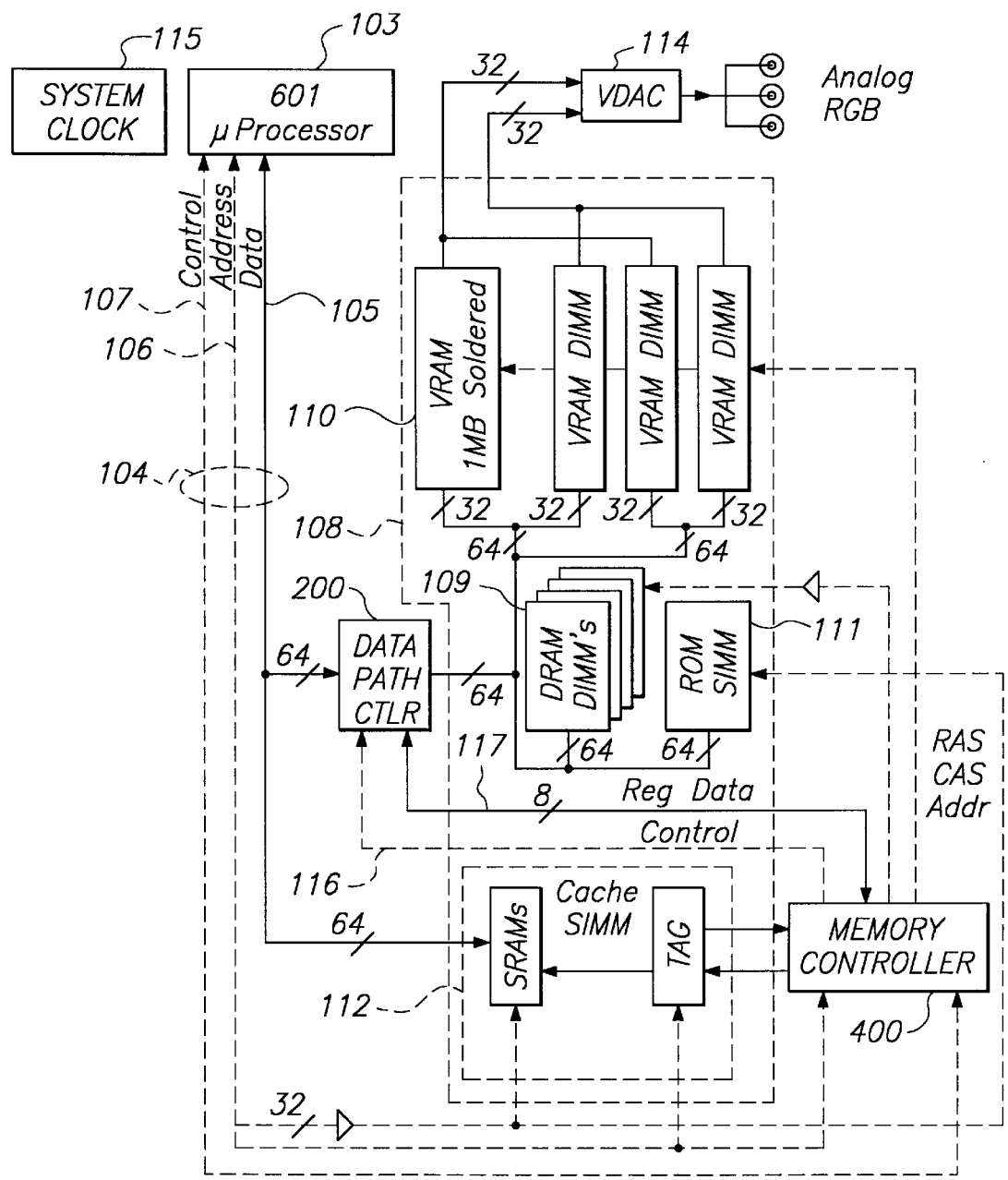
FIG. 1 is a system-level block diagram of a computer system in which the present invention may be used.

Referring now to FIG. 1, the present hardware graphics accelerator may be used in a computer system of the type shown. A data processor 103 (for example a Power PC 601 microprocessor) is connected to a system bus 104, including a system data bus 105, an address bus 106, and a control bus 107. A memory subsystem 108 includes, in the illustrated embodiment, a main memory 109, a video memory 110, a read-only memory 111, and a level-two cache memory 112. The data processor 103, through the system bus 104, is connected directly to the level-two cache memory 112. The data processor 103 is connected indirectly to the main memory 109, the video memory 110, and the read-only memory 111 through a datapath circuit 200 and a memory controller 400. In general, the datapath circuit 200 provides for 32- or 64-bit reads from and writes to memory, in either big-endian or little endian mode. In big-endian mode, bytes are stored in memory highest-order-byte-first. Conversely, in little-endian mode, bytes are stored in memory lowest-order-byte-first.

The memory controller 400 controls the various memory devices within the memory subsystem 108 in response to signals on the system bus 104 and, in particular, provides address and control signals (i.e., RAS and CAS) to the main memory 109 and the video memory 110. The datapath circuit 200 and the memory controller 400 are connected by a set of control lines 116 from the memory controller 400 to the datapath circuit 200 and by a register data bus 117, which is bidirectional. The present hardware graphics accelerator includes a graphics accelerator datapath 300 contained within the datapath circuit 200 and a graphics accelerator controller 1600 (FIG. 16) contained within the memory controller 400.

The video memory 110 is a dual-port memory device. One port (read/write) is connected to the datapath circuit 200 and another port (video read-only) is connected to a video DAC 114, which produces a video signal such as an analog RGB video signal. Also shown is a system clock 115, which provides clock signals for the data processor 103 as well as for various other ones of the devices within the system.

Figure 2:
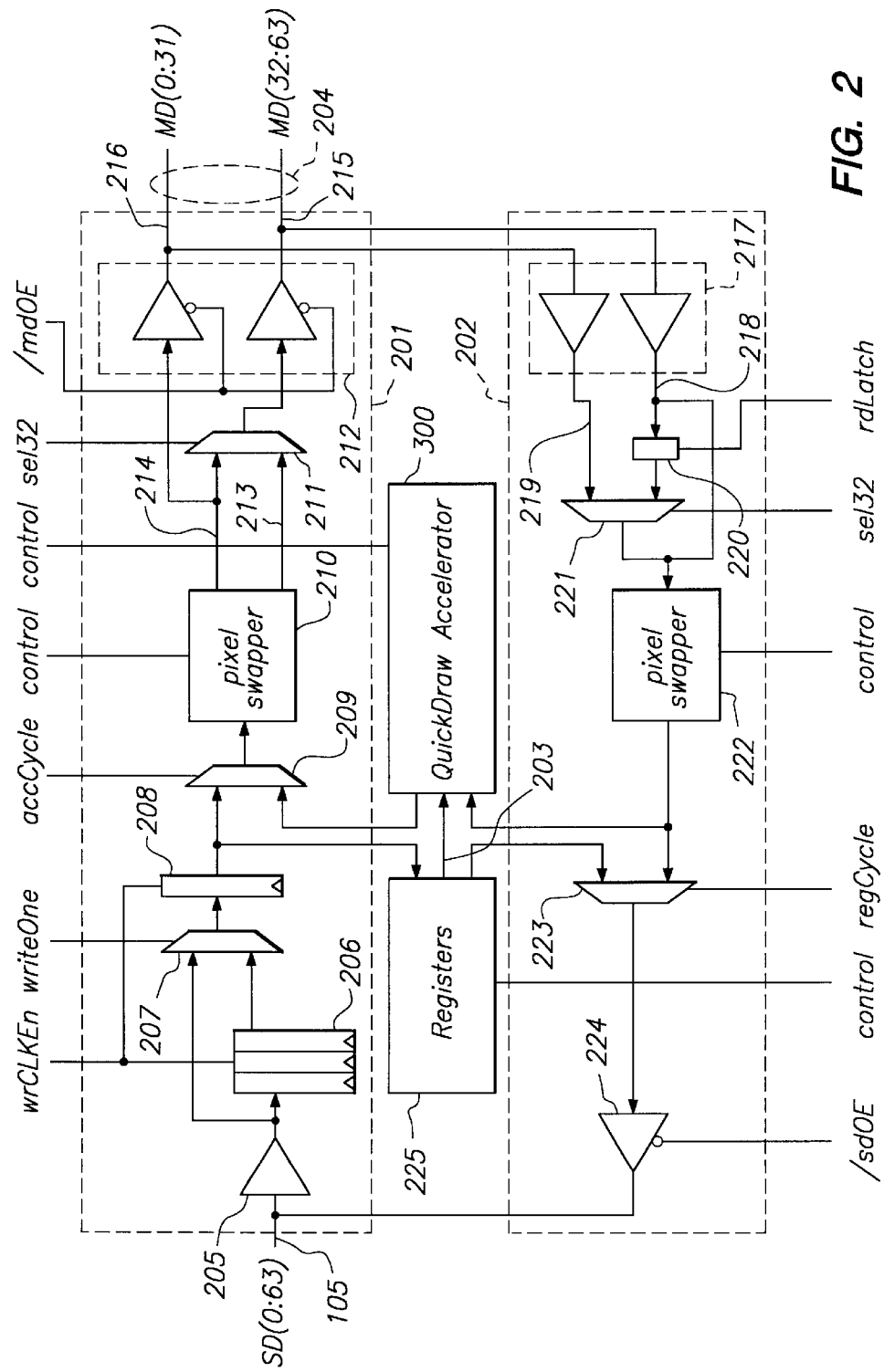
FIG. 2 is a block diagram of the datapath circuit 200 of FIG. 1.

Referring to FIG. 2, the datapath circuit 200 is shown in greater detail, including a graphics accelerator datapath 300. In a preferred embodiment, the hardware graphics accelerator is a QuickDraw graphics accelerator.

The datapath circuit 200 includes a forward datapath 201 and a reverse datapath 202, each of which is connected to both the system data bus 105 and a memory data bus 204. In addition, the datapath circuit 200 includes the graphics accelerator datapath 300 and a configuration register file 225. The graphics accelerator datapath 300 and the configuration register file 225 are each connected to both the forward datapath 201 and the reverse datapath 202 and are also connected to each other by an internal register bus 203 from the configuration register file 225 to the graphics accelerator datapath 300. Various control signals are applied to circuit elements in the forward datapath 201 and the reverse datapath 202, and to the graphics accelerator datapath 300 and the configuration register file 225. These control signals are supplied by the graphics accelerator controller 1600.

In the forward direction, data enters the datapath circuit 200 on the system data bus 105 and is buffered by a buffer 205. The data is then entered in a write data queue 206 and is also applied to a multiplexer 207. The multiplexer 207 selects either data currently being written or data at the head of the write data queue 206 to be latched into a write latch 208. In particular, the data processor 103 can write single words (If 1–8 bytes) or cache line bursts (four words of eight bytes each). During single-word writes, the write data queue 206 is bypassed to avoid unnecessary delays.

A write operation may be a write to memory or to the configuration register file 225. Data in the write latch 208 is therefore applied to the configuration register file 225 and to a multiplexer 209. Furthermore, data to be written to memory may originate either from the system data bus 105 or from the graphics accelerator datapath 300. For example, the data processor 103 might issue a QuickDraw call requesting that a region is to be filled with specified pattern. In response, bits within that region will be read into the graphics accelerator datapath 300 from memory, altered in accordance with the specified pattern, and written back out to memory. Therefore, the multiplexer 209 receives data from both the write latch 208 and the graphics accelerator datapath 300 and selects data from one of these sources to be applied to a pixel swapper 210.

The pixel swapper 210 provides for flexibility in choice of computer operating system by receiving data in either of two representations and outputting that data in a single consistent representation for storage in memory. In a preferred embodiment, the pixel swapper 210 outputs data in big-endian representation. The pixel swapper 210 may be controlled to converts data from little-endian or mixed-endian representations to big-endian representation.

In a preferred embodiment, the video memory 110 includes 1MB of VRAM soldered on the motherboard and may optionally includes another 1MB of VRAM for a total of 2MB VRAM. Depending on whether 1MB or 2MB of VRAM is present in the system, transfers to VRAM are performed as either 32-bit or 64-bit transfers. In particular, the pixel swapper 210 produces two 32-bit data words, a lower data word and an upper data word, which are applied to a multiplexer 211 on a lower internal write data bus 213 and an upper internal write data bus 214, respectively. The upper internal write data bus 214, carrying the upper data word, is also connected directly to a corresponding one of two tri-state buffers 212. The other one of the tri-state buffers 212 is connected to an output of the multiplexer 211. In a 64-bit transfer mode, the multiplexer 211 selects the lower data word on the lower internal write data bus 213 such that the tri-state buffers 212, when enabled, drive the lower data word on a lower memory data bus portion 215 and the upper data word on a upper memory data bus portion 216. In a 32-bit transfer mode, the multiplexer 211 and the tri-state buffers 212 are used to serialize first the upper data word and then the lower data word onto the lower memory data bus portion 215.

In the reverse direction, data enters the datapath circuit 200 on the lower memory data bus portion 215 and the upper memory data bus portion 216 and is buffered by two buffers 217 to produce a lower data word and an upper data word on a lower internal read data bus 218 and an upper internal read data bus 219, respectively. The upper internal read data bus 219 is connected to a multiplexer 221. The lower internal read data bus 218 is connected directly to a pixel swapper 222 and to a read latch 220, the output of which is connected to the multiplexer 221. In 64-bit transfer mode, the multiplexer 221 selects the upper data word on the upper internal read data bus 219 while one of the buffers 217 drives the lower data word on the lower internal read data bus 218. In a 32-bit transfer mode, the multiplexer 221 and the read latch 220 are used to deserialize the data words, with the upper data word being produced from VRAM first and then the lower data word, so as to input a 64-bit quantity to the pixel swapper 222.

The pixel swapper 222 performs the reverse conversion of the conversion, if any, performed by the pixel swapper 210. The output of the pixel swapper 222 is applied to the graphics accelerator datapath 300 and to a multiplexer 223. The multiplexer 223 receives data from both the graphics accelerator datapath 300 and the configuration register file 225 and selects data from one of these sources to be applied to a tri-state buffer 224, which when enabled drives the system data bus 105.

Figure 3:
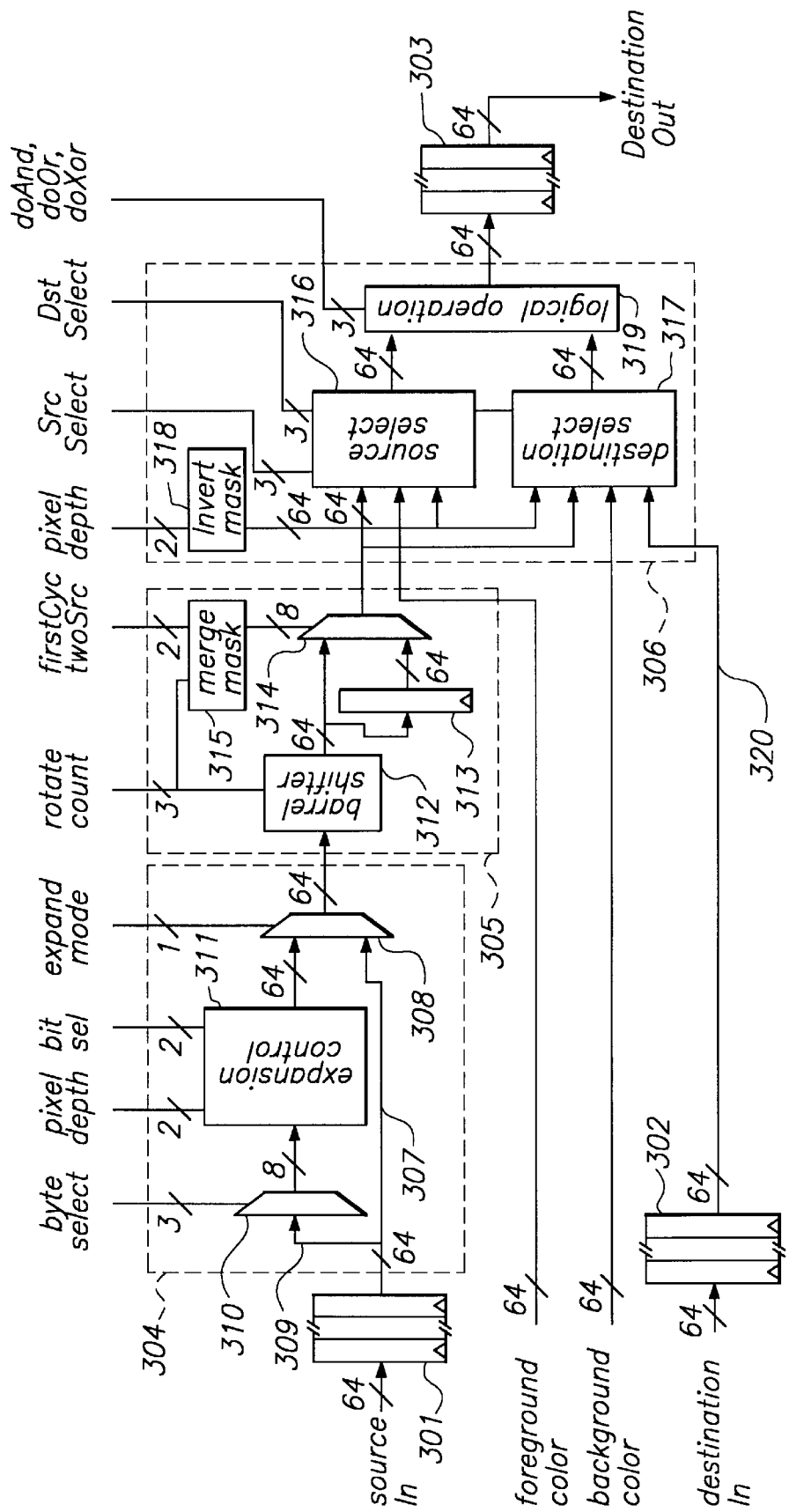
FIG. 3 is a more detailed block diagram of a portion of the graphics accelerator datapath 300 of FIG. 2.

Referring to FIG. 3, the graphics accelerator datapath 300 includes a source FIFO 301, a destination read FIFO 302, a destination write FIFO 303, and "bit-munging" circuitry including expansion circuitry 304, alignment circuitry 305, and operation circuitry 306. Various control signals to control the various circuitry are generated by control logic within the graphics accelerator datapath 300. The construction of such control logic is a matter of routine skill and will not be further described.

Source data may be manipulated by the operation circuitry 306 and written to a destination region, or source data and destination data from a destination region may be combined or manipulated in some fashion by the operation circuitry 306 and written to the destination region (overwriting the previous destination data). Before these operations can occur, however, the source data must be made to have the same pixel depth and alignment as the destination data (i.e., the data stored in the destination region), whether or not the destination data is involved in the operation. In a preferred embodiment, source and destination data may have pixels depths of 1, 8, 16, or 32 bits per pixel. Furthermore, the source and destination regions may each begin at any pixel location within any 64-bit memory word. Therefore, to take an arbitrary example, the source data may be 1 bit-per-pixel data and the destination data may be 16 bit-per-pixel data. Before the source data may be used to derive data to be written to the destination, the source data must therefore be expanded into 16 bit-per-pixel data. To take another example, the source data and the destination data may both be 16 bits-per-pixel data, but the source region may begin on a 64-bit memory word boundary and the destination region may begin in the middle (e.g., bit 32) of a 64-bit memory word. Before the source data may be used to derive data to be written to the destination, the source data must therefore be shifted 32 bits to align it with the destination data. Expansion is performed by the expansion circuitry 304. Alignment is performed by the alignment circuitry 305.

When the source data does not require any expansion, source data from the head of the source FIFO 301 is placed on a bypass bus 307, selected by a multiplexer 308, and applied to the alignment circuitry 305. When the source data does require expansion, source data from the head of the source FIFO 301 is placed on an expand data bus 309 and selected one byte at a time by a multiplexer 310. The data byte selected by the multiplexer 310 is applied to an expansion control unit 311. In the expansion control unit 311, the data byte is expanded to match the pixel depth of the destination data. An expanded 64-bit data word is then selected by the multiplexer 308 and applied to the alignment circuitry 305.

In particular, an output of the multiplexer 308 is applied to a barrel shifter 312. During a given operation, the barrel shifter 312 rotates all input words by a number of bytes specified in a rotate count. Part of the rotated data is used on the current cycle, and part is used on the next cycle. The barrel shifter 312 holds the current rotated data, and a register 313 holds the previous rotated data. The two rotated data words are input to a 128-to-64 multiplexer 314. Under control of a merge mask register 315, the 128-to-64 multiplexer 314 merges the two rotated data words on an 8-bit boundary.

A resulting 64-bit word is input to both a source select unit 316 and a destination select unit 317. The 64-bit contents of an invert mask register 318 are also input to both the source select unit 316 and the destination select unit 317. The source select unit 316 has as a further input a 64-bit foreground color input from the configuration register file 225 on the internal register bus 203. The destination select unit 317 has two further inputs. A 64-bit background color is input from the configuration register file 225 on the internal register bus 203. Also, destination data from the head of the destination read FIFO 302 is input on an internal bus 320.

One of the inputs to source select unit 316 and one of the inputs to the destination select unit 317 are selected and input to a logical operation unit 319. Note that, for a source-only operation, a source-derived data word may be selected by both the source select unit 316 and the destination select unit 317. The logical operation unit 319 performs one of various operations on the selected data words and produces a 64-bit output word, which is entered into the destination write FIFO 303.

In a preferred embodiment, the operations ("raster operations") performed by the logical operation unit 319 are QuickDraw operations and may include any or all of the following operations, defined in greater detail in *INSIDE MACINTOSH, Imaging With QuickDraw*, published by Apple Computer, Inc. and incorporated herein by reference:

TABLE I

| Operation name | Logical Operation |
|---|---|
| srcCopy | dst = src |
| srcOr | dst = src \| dst |
| srcXor | dst = src ^ dst |
| srcBic | dst = src & dst |
| notSrcCopy | dst = ~src |
| notSrcOr | dst = ~src \| dst |
| notSrcXor | dst = ~src ^ dst |
| notSrcBic | dst = ~src & dst |
| patCopy | dst = pat |
| patOr | dst = pat \| dst |
| patXor | dst = pat ^ dst |
| patBic | dst = pat & dst |
| notPatCopy | dst = ~pat |
| notPatOr | dst = ~pat \| dst |
| notPatXor | dst = ~pat ^ dst |
| notPatBic | dst = ~pat & dst |

Figure 4:
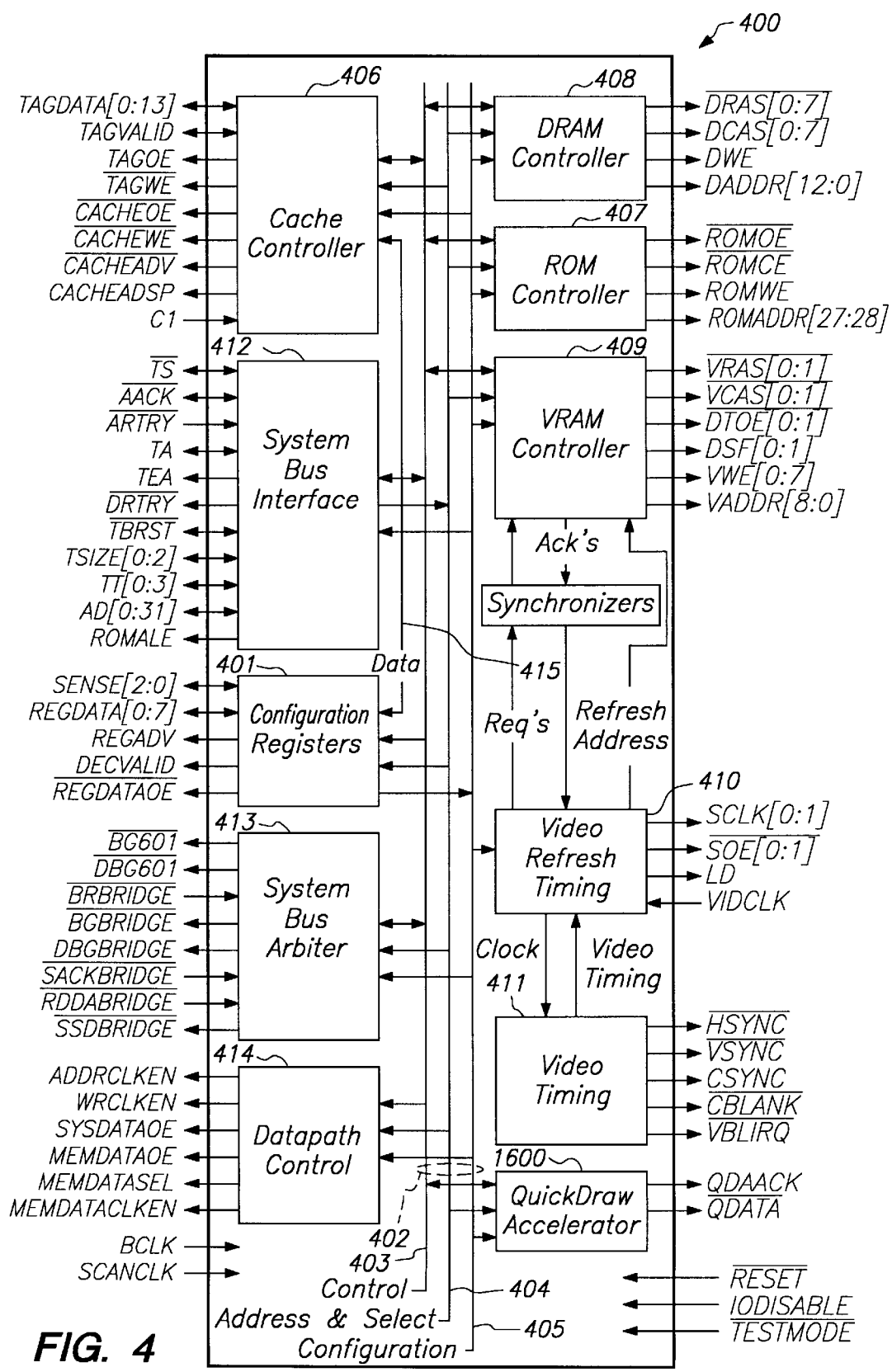
FIG. 4 is a block diagram of the memory controller 400 of FIG. 1.

Referring to FIG. 4, the memory controller 400 contains various functional units, connected together by a control bus 403, an address and select bus 404, and a configuration bus 405. Separate specialized memory controllers are provided for each type of memory in the memory subsystem 108, namely a cache controller 406, a ROM controller 407, a DRAM controller 408, and a VRAM controller 409. Both video timing and video refresh are controlled by the memory controller 400, by a video signal timing unit 411 and a video refresh timing unit 410, respectively. The video refresh timing unit 410 generates addresses needed to up data the display. The VRAM controller 409 uses these addresses to perform read transfer cycles.

Various units provide interface functions to the rest of the system through the system bus 104. These units include a system bus interface 412, a system bus arbiter 413, and a configuration register file 401. The configuration register file 401 includes a cache configuration register, the contents of which are supplied to the cache controller 406. A separate data bus 415 is used to write data to and read from the cache tag RAMs during testing.

In addition, the memory controller 400 includes a datapath control unit 414 and a graphics accelerator controller 1600. The datapath control unit 414 generates control signals for the datapath circuit 200. The graphics accelerator controller 1600 is invoked by a software initialization routine, or "init," that in effect traps calls to QuickDraw, determines whether that call may be accelerated, and either passes the call on to QuickDraw in system ROM if the call cannot be accelerated or issue a command to the graphics accelerator controller 1600 if the call can be accelerated. In response, the graphics accelerator controller 1600 controls the operation of one or both of the DRAM controller 408 and the VRAM controller 409 to retrieve graphics data from memory, coordinates operation of the datapath circuit 200 on the graphics data, and controls the operation of one or both of the DRAM controller 408 and the VRAM controller 409 to return the graphics data to memory.

The graphics accelerator controller 1600 interfaces with the system bus arbiter 413 to set up address-only bus transactions on the system bus 104 when the graphics accelerator controller 1600 causes main memory 109 to be accessed, thereby allowing the data processor 103, with its level-one cache, to perform "snooping" to maintain cache coherency.

Of the various functional units in FIG. 4, the graphics accelerator controller 1600 and the configuration register file 401 are most pertinent to the present invention. The remaining units will therefore not be described in greater detail. The configuration register file 401 contains a relatively large number of registers, a subset of which relate to the present hardware graphics accelerator and which are shown in FIG. 5 through FIG. 15.

Figure 5:
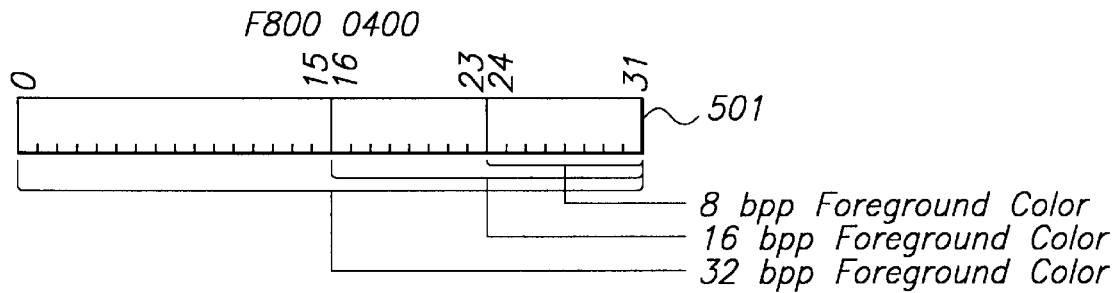
FIG. 5 is a diagram of a foreground color register 501 within the configuration register file 401 of FIG. 4.

Referring to FIG. 5, a foreground color register 501 is a 32-bit register that holds the current foreground color. Valid data is right justified and depends on the current pixel depth. This register physically exists in the datapath circuit 200 only, but can be read and written in the register space of the memory controller 400 for ease of use.

Figure 6:
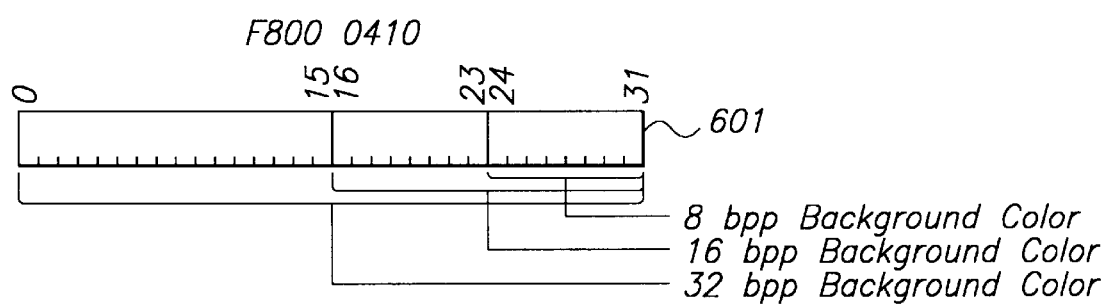
FIG. 6 is a diagram of a background color register 601 within the configuration register file 401 of FIG. 4.

Referring to FIG. 6, a background color register 601 is a 32-bit register that holds the current background color. Valid data is right justified and depends on the current pixel depth. This register physically exists in the datapath circuit 200 only, but can be read and written in the register space of the memory controller 400 for ease of use.

Figure 7:
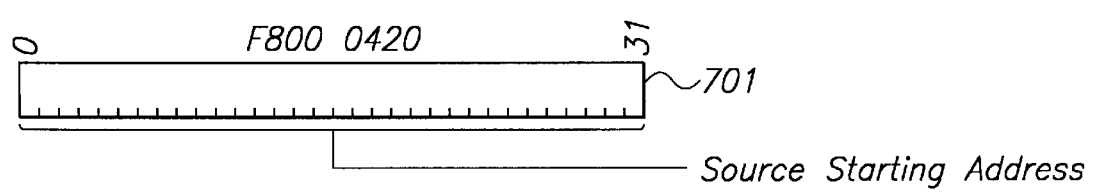
FIG. 7 is a diagram of a source starting address register 701 within the configuration register file 401 of FIG. 4.

Referring to FIG. 7, a source starting address register 701 is a 32-bit register that holds the address of the first pixel to be read from the source image. This pixel is usually the pixel in the upper left or lower right corner of the source image, but may be any pixel in the source when a pattern transfer mode is selected.

Figure 8:
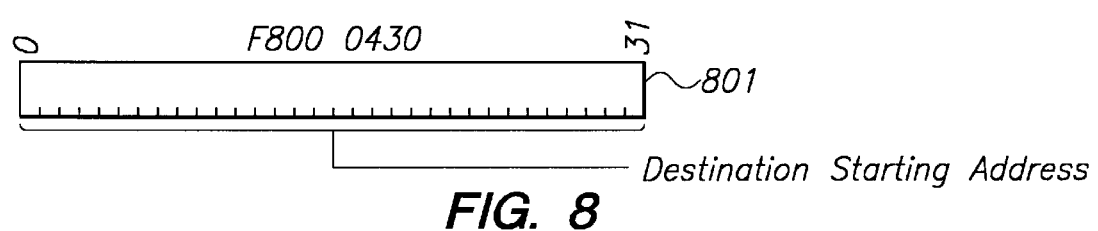
FIG. 8 is a diagram of a destination starting address register 801 within the configuration register file 401 of FIG. 4.

Referring to FIG. 8, a destination starting address register 801 is a 32-bit register that holds the address of the first pixel to be written to in the destination image. This pixel must be the pixel in the upper left of lower right corner of the destination image. Which corner depends on how the source and destination images overlap.

Figure 9:
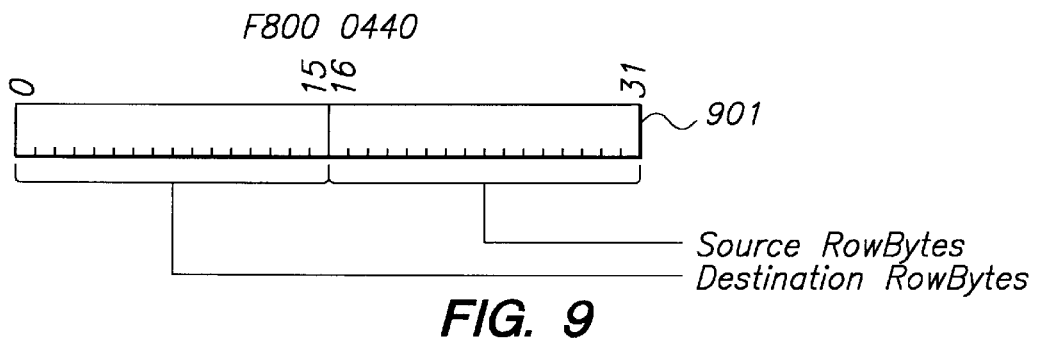
FIG. 9 is a diagram of a destination/source row bytes register 901 within the configuration register file 401 of FIG. 4.

Referring to FIG. 9, a destination/source row bytes register 901 is a 32-bit register that holds the row bytes values of the source and destination images. Row bytes refers to the number of bytes from the start of one line of the image to the start of the next line of the image. These values must be a multiple of the current pixel depth (in bytes).

Figure 10:
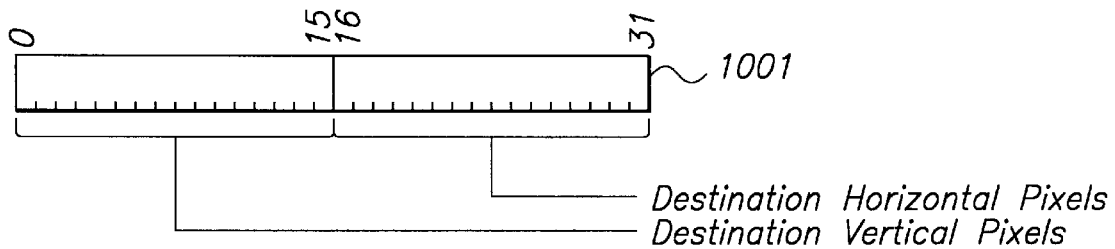
FIG. 10 is a diagram of a destination vertical/horizontal size register 1001 within the configuration register file 401 of FIG. 4.

Referring to FIG. 10, a destination vertical/horizontal size register 1001 is a 32-bit register that holds the vertical and horizontal dimensions, in pixels, of the destination image (and the source image if a pattern mode is not selected).

Figure 11:
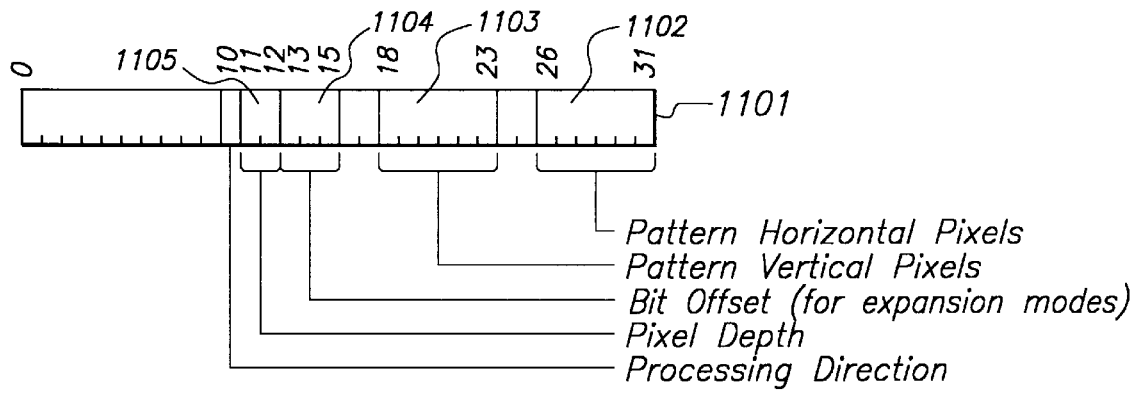
FIG. 11 is a diagram of a first control register 1101 within the configuration register file 401 of FIG. 4.

Referring to FIG. 11, a first control register 1101 is a 32-bit register that has a number of fields that help to define the operation the accelerator is to perform. A pattern horizontal pixels field 1102 specifies the horizontal size, in pixels, of the source pattern. A pattern vertical pixels field 1103 specifies the vertical size, in pixels, of the source pattern. A bit offset field 1104 gives the initial offset into the first byte of a one bit-per-pixel (bbp) source image, where bit 0 is the most significant bit and bit 7 is the least significant bit. A pixel depth field 1105 encodes the bit depth of the destination, where 0=8 bpp, 1=16 bpp, and 2=32 bpp. Finally, a processing direction field 1106 is a single-bit field that tells the accelerator how it should traverse the source and destination images. If this bit is a 1, address will be incremented so the image will be processed left to right, top to bottom. If this bit is a 0, addressed will be decremented, so the image will be processed tight to left, bottom to top.

Figure 12:
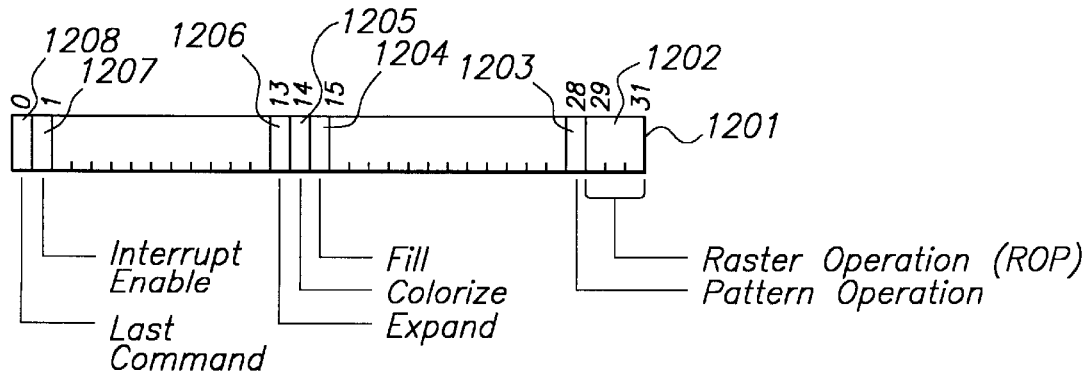
FIG. 12 is a diagram of a second control register 1201 within the configuration register file 401 of FIG. 4.

Referring to FIG. 12, a second control register 1201 is a 32-bit register that has a number of fields that help to define the operation the accelerator is to perform. A raster operation field 1202 determines which of eight standard QuickDraw transfer mode will be used during the next accelerator operation. The remaining fields are all single-bit fields. A pattern operation bit 1203 is set when the source image is a pattern to be tiled onto the destination rectangle. A fill bit 1204 is set to instruct the accelerator to fill the destination rectangle with the value in the foreground color register. A colorize bit 1205 is set to instruct the accelerator to use the foreground color and background color registers when writing to the destination. An expand bit 1206 is set to instruct the accelerator to treat the source image or pattern as a 1 bpp bit map. The source will be expanded out to the pixel depth specified in the first control register 1101 before it is combined with the destination image. An interrupt enable bit 1207 is set to enable a command completion interrupt from the accelerator. Finally, in one version of the hardware graphics accelerator, a last command bit 1208 is set to tell the accelerator that the current command is the last one in a list of commands pointed to by a command list pointer register 1401, shown in FIG. 14. The command list pointer register 1401 holds a memory address that points to a list of accelerator commands to be executed. When this feature is implemented, the accelerator will complete the last command in the list and halt.

Figure 13:
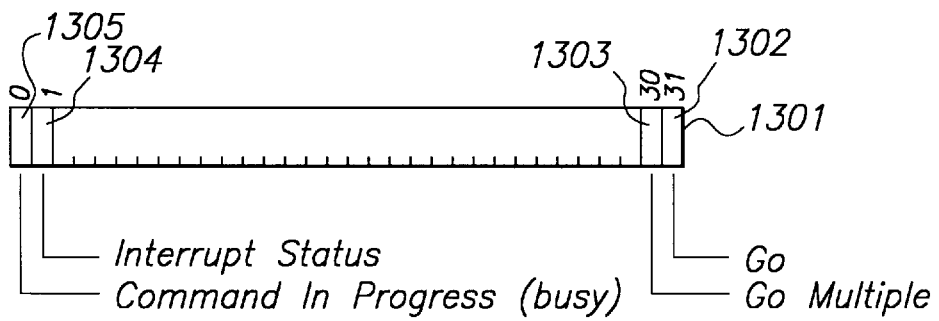
FIG. 13 is a diagram of a command/status register 1301 within the configuration register file 401 of FIG. 4.
Figure 14:
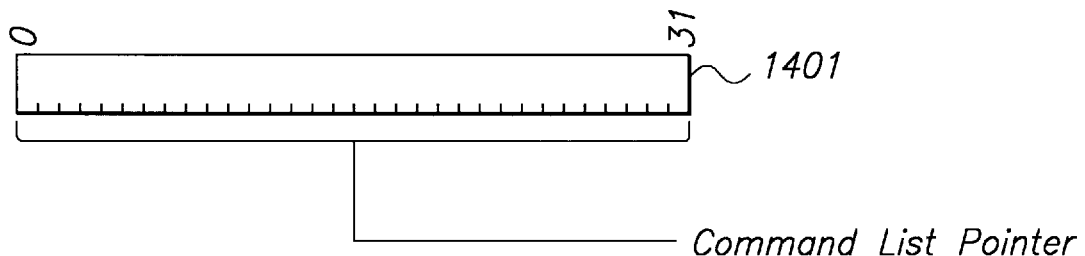
FIG. 14 is a diagram of a command list pointer register 1401 within the configuration register file 401 of FIG. 4.

Referring to FIG. 13, a command/status register 1301 is a 32-bit register that has a number of fields, all of which are single-bit fields. A go bit 1302 is set to start the accelerator. The accelerator will clear this bit once it starts. Assuming that a command list feature is implemented, a go multiple bit 1303 is set to instruct the accelerator to execute the list of commands pointed to the command list pointer register. An interrupt status bit 1304 is set upon completion of the current command. If the interrupt enable bit in the second control register 1201 is set, an interrupt will also be generated. Finally, a command in progress bit 1305, if set indicates that the accelerator is busy executing the current command. If it is cleared, the accelerator is idle and can be programmed for the next operation.

Figure 15:
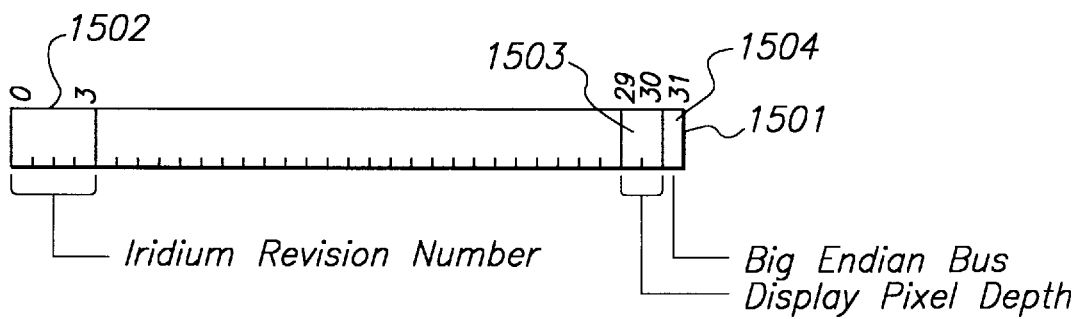
FIG. 15 is a diagram of a system configuration register 1501 within the configuration register file 401 of FIG. 4.

Referring to FIG. 15, a system configuration register 1501 is a 32-bit register that has a number of fields. This register physically exists in the datapath circuit 200 only, but can be read and written in the register space of the memory controller 400 for ease of use. A datapath circuit revision number field 1502 is read-only and contains the revision level for the datapath circuit 200. A big-endian bus field 1503 indicates the data orientation on the system bus. If set (the default state), data and addresses on the system bus are assumed to be in big-endian order. If cleared, data and addresses are assumed to be little-endian. This bit is provided for compatibility with little-endian operating systems.

Figure 16:
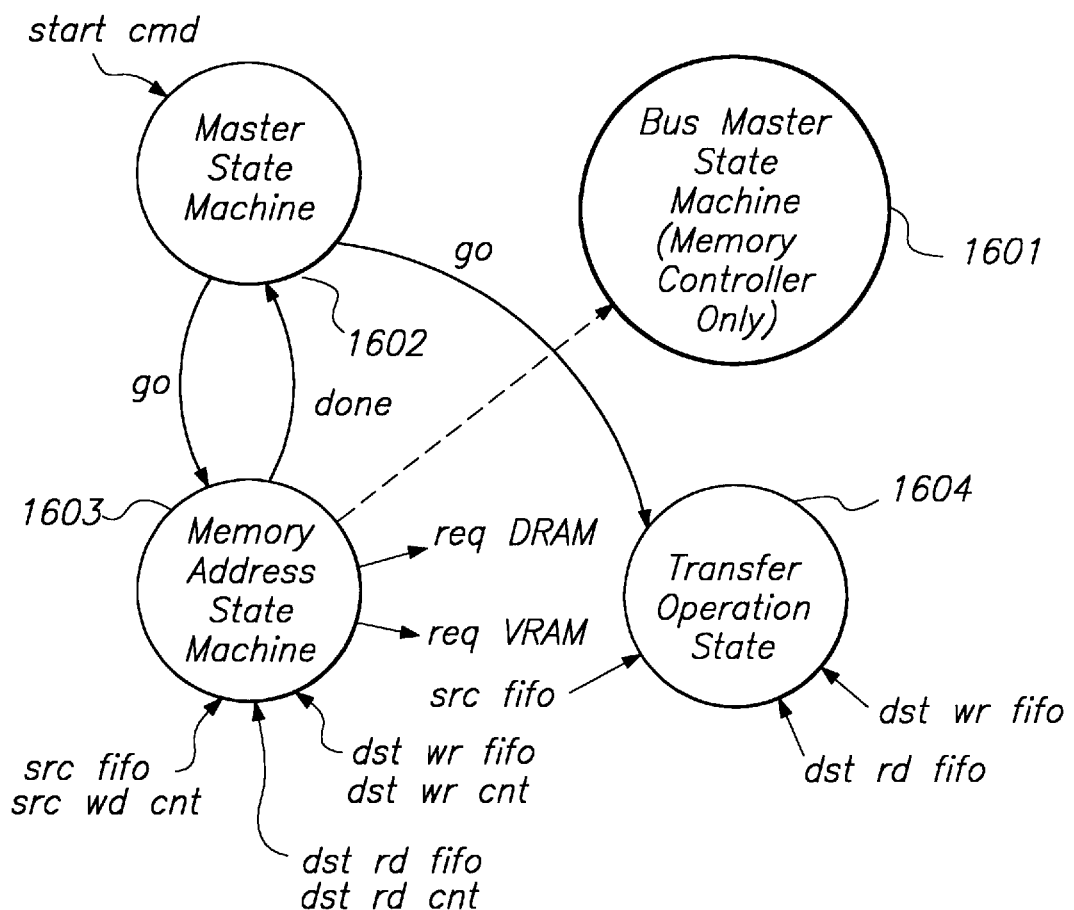
FIG. 16 is a diagram of the graphics accelerator controller 1600 of FIG. 4, illustrating various state machines contained therein.

Referring now to FIG. 16, the graphics accelerator controller 1600 will be described in greater detail. The graphics accelerator controller 1600 consists primarily of a number of state machines, including a master state machine 1602, a memory address state machine 1603, a transfer operation state machine 1604 and a bus master state machine 1601. The master state machine 1602 executes overall control and supervises the memory address state machine 1603 and the transfer operation state machine 1604. When the master state machine 1602 receives a start command (i.e., the go bit 1302 is set by the "software init" previously described) it issues go commands to the memory address state machine 1603 and the transfer operation state machine 1604.

The memory address state machine 1603 functions in analogous fashion to a DMA controller. The memory address state machine 1603 issues DRAM and/or VRAM requests as determined by command information stored in the configuration register file 401 until various programmed counters reach their respective terminal counts. These counters include a source word counter, a destination read counter, and a destination write counter, which are loaded and kept by the memory address state machine 1603 in a manner described more fully hereinafter. The memory address state machine 1603 also receives control signals from the source FIFO 301, the destination read FIFO 302 and the destination write FIFO 303. Flow control is performed in accordance with these signals to prevent the FIFOs from being overwritten or underwritten.

The transfer operation state machine 1604 is responsive to the same control signals from the FIFOs to transfer data from the source FIFO 301 and the destination read FIFO 302, through the remainder of the graphics accelerator datapath 300 to the destination write FIFO 303.

The bus master state machine 1601 receives DRAM requests from the memory address state machine 1603 and for each request causes an address-only bus transaction on the system bus 104 to maintain cache coherency.

The bus master state machine 1601 is located in the graphics accelerator controller 1600 only. Preferably, the master state machine 1602, the memory address state machine 1603, and the transfer operation state machine 1604 are replicated in both the graphics accelerator controller 1600 and the graphics accelerator datapath 300. This replication allows operation of the graphics accelerator controller 1600 and the graphics accelerator datapath 300 to be coordinated using only a small number of signals.

Referring briefly to FIG. 4, notice that the graphics accelerator controller 1600 outputs only two signals to the graphics accelerator datapath 300, namely QDAACK and QDATA__, in order to coordinate operation of the graphics accelerator controller 1600 and the graphics accelerator datapath 300. As a result, valuable I/O pins are conserved for other uses.

Referring again to FIG. 16, despite replication of the state machines (except for the bus master state machine 1601), the main work of one of the state machines may occur principally in only one or the other of the graphics accelerator controller 1600 and the graphics accelerator datapath 300. For example, the principle work of the memory address state machine 1603 occurs in the graphics accelerator controller 1600, which generates memory addresses as part of the memory controller 400. Conversely, the principle work of the transfer operation state machine 1604 occurs in the graphics accelerator datapath 300, where the various FIFOs are located. Nevertheless, full replication of the state machines proves advantageous from the standpoint of minimizing pin count. Because the two replicated sets of state machines operate in lockstep, only a minimum of information need be transferred between them.

Figures 1, 21:
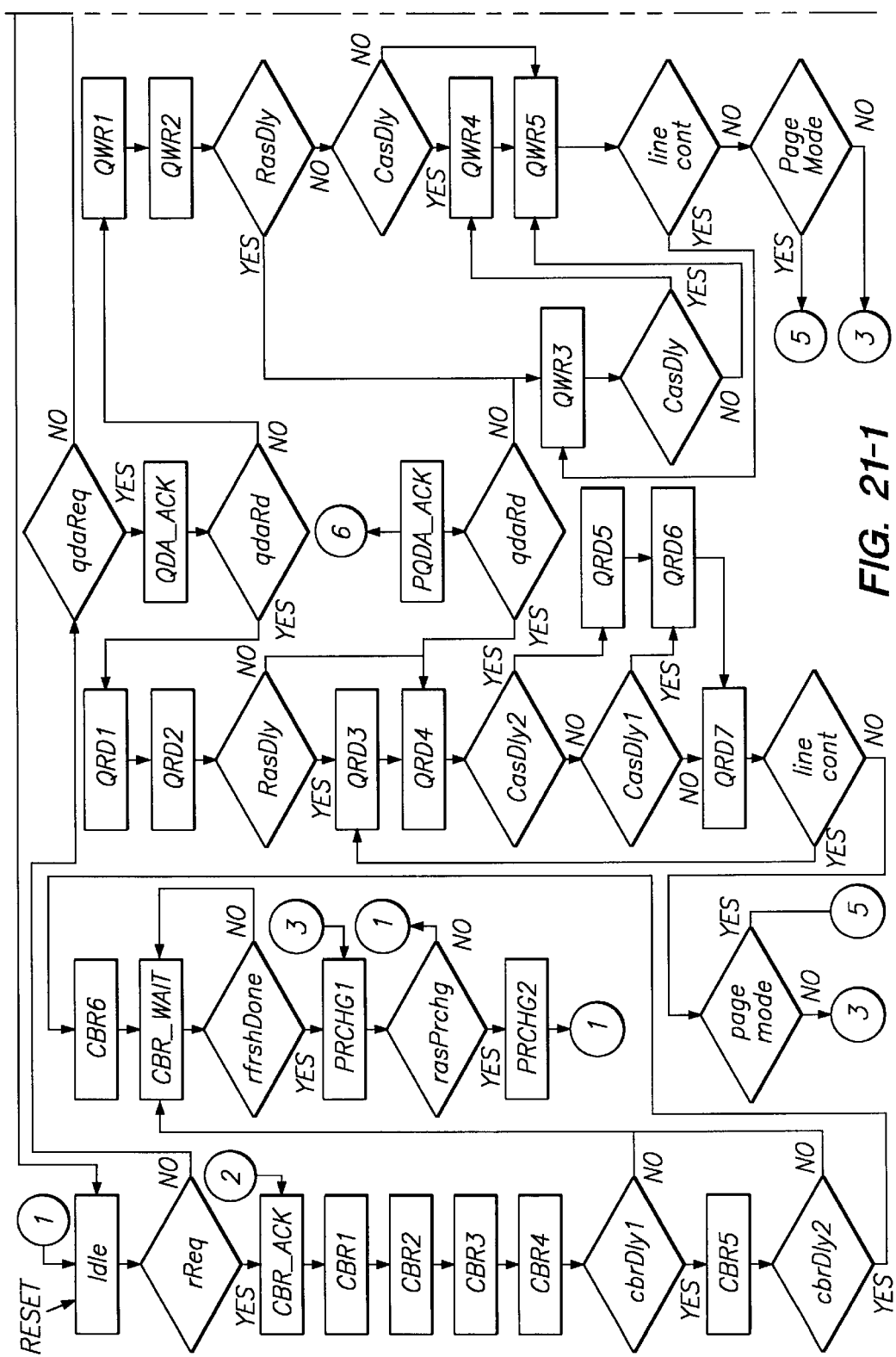
FIG. 21 is a first part of a state diagram of a DRAM state machine in accordance with the present invention.
Figures 2, 21:
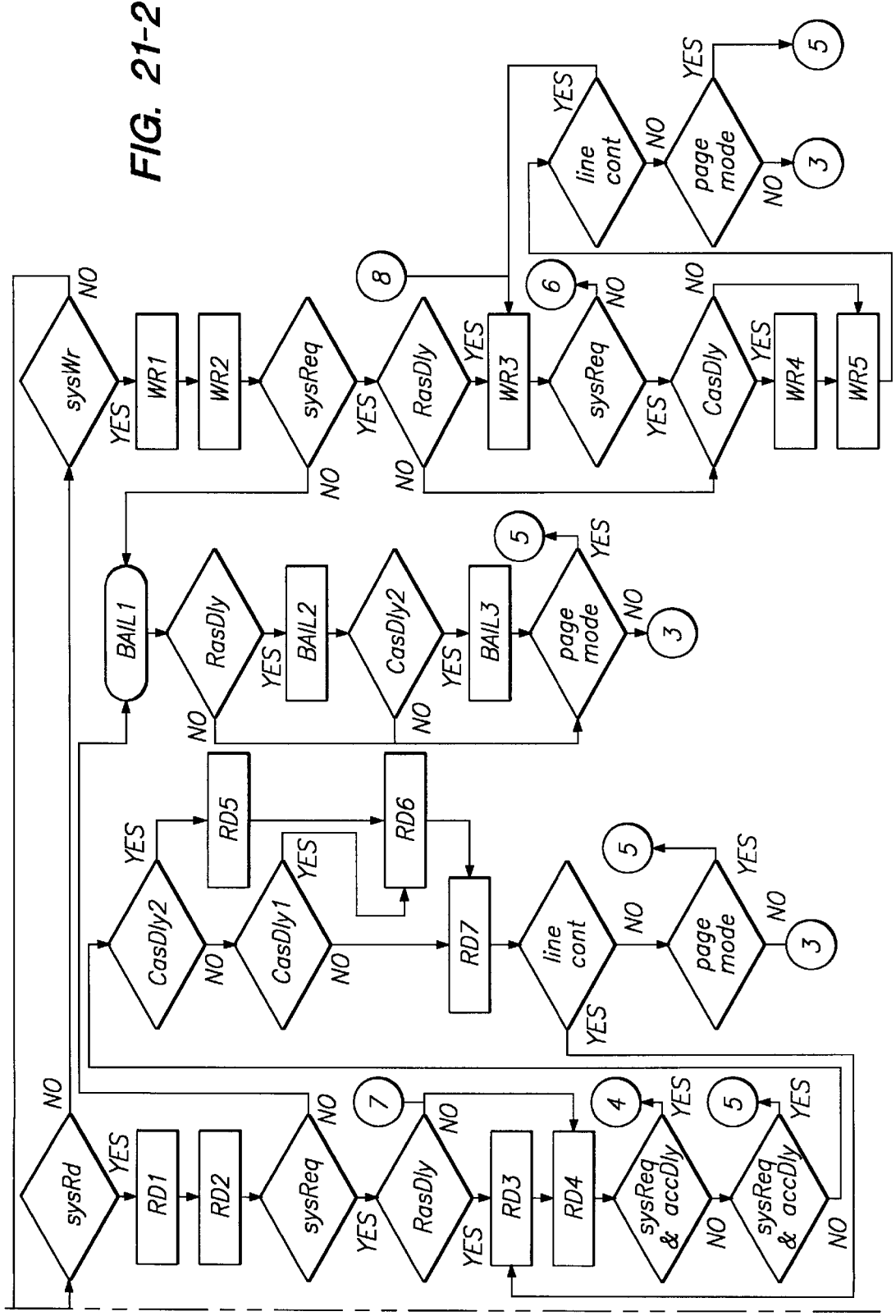
Figure 21:
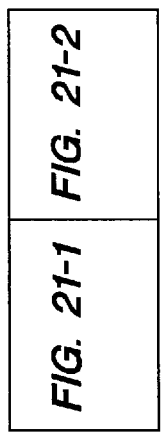
Figure 22:
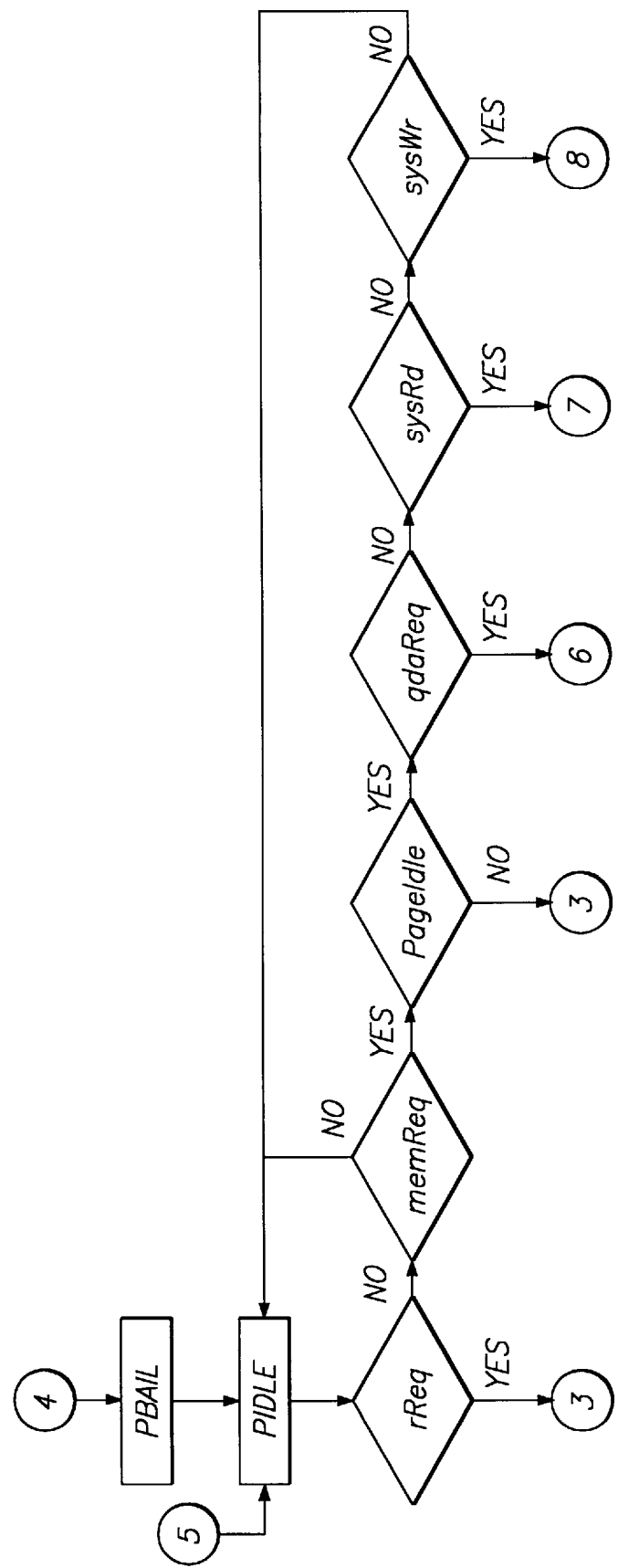
FIG. 22 is a second part of a state diagram of a DRAM state machine in accordance with the present invention.

The master state machine 1602, the transfer operation state machine 1604, the memory address state machine 1603 and the bus master state machine 1601, described generally, heretofore, will now be described in greater detail in relation to the state diagrams of FIG. 20 through FIG. 22. In FIG. 20 through FIG. 22, various states of the state machines are represented as rectangular blocks, with conditions for transitioning from one state to another state being represented as decisions, in similar manner as a software flowchart. In a preferred embodiment, however, the state machines are realized in hardware as part of an application-specific integrated circuit, or ASIC. In the following description, states will be referred to by the state names indicated in the respective figures. Operation of each of the state machines begins from an IDLE state, indicated in double outline. Each of the state machines is place in the IDLE state upon reset.

Figure 17:
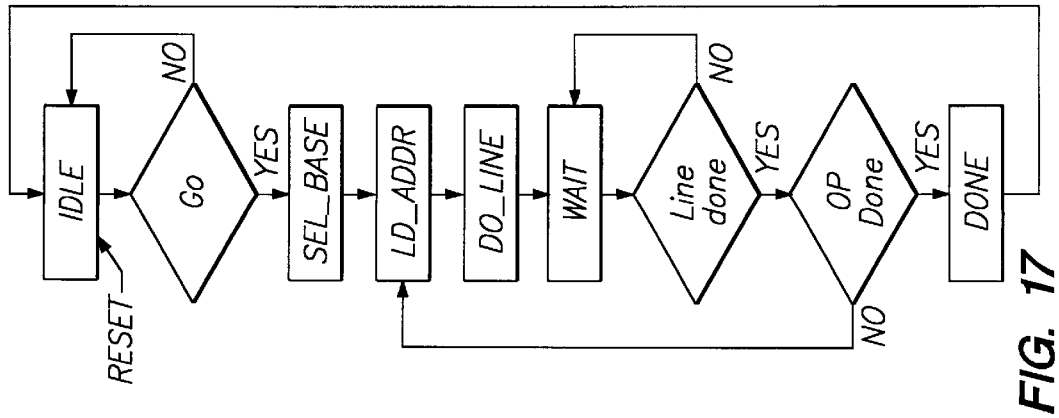
FIG. 17 is a state diagram of a master state machine 1602 of FIG. 16.

Referring to first to FIG. 17, the master state machine 1602 will be described. The master state machine 1602 operates on a line-by-line basis. It remains in the IDLE state until a go command is registered in the go bit 1302 of the command/status register 1301. Once a go command has been received, the master state machine 1602 enters a SEL__BASE state in which a base address register is loaded in accordance with the results of an address decode operation. Then, in a LD__ADDR state, a source word counter, a destination read counter, and a destination write counter are loaded based on call parameters provided by the calling program. There then follows a DO__LINE state in which the master state machine 1602 issues go commands to the transfer operation state machine 1604 and the memory address state machine 1603.

The master state machine 1602 then enters a WAIT state and remains in this state until the memory address state machine 1603 sends a done signal to the master state machine 1602, indicating that the operations pertaining to a single line have been completed. The master state machine 1602 then checks to see if the line completed was the last line involved in the overall operation. If not, the LD__ADDR state is reentered and another line is begun. If the line completed was the last line, then a DONE state is entered, in which completion of the operation is signalled by setting a register bit or by generating an interrupt.

Figure 18:
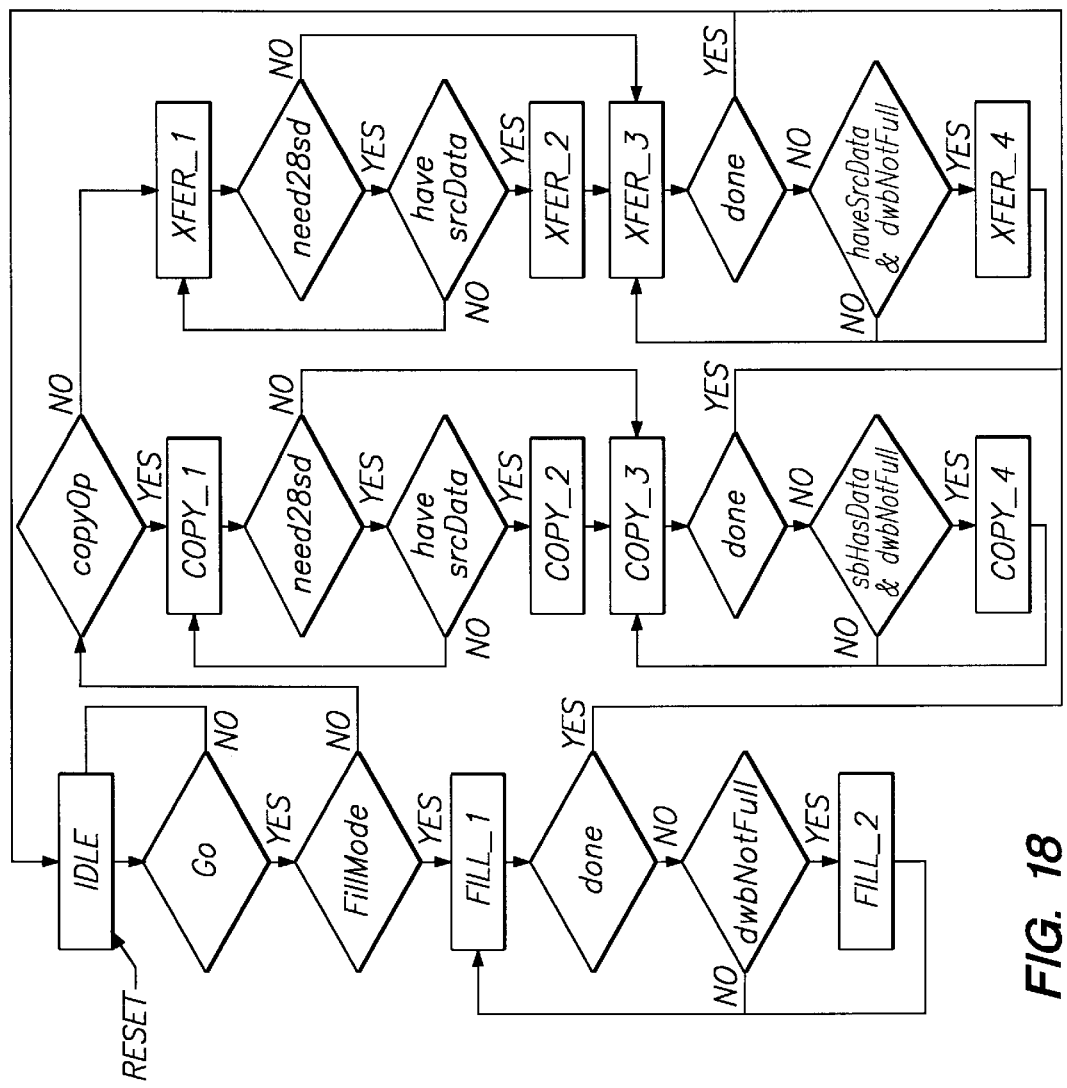
FIG. 18 is a state diagram of a transfer operation state machine 1604 of FIG. 16.

Referring to FIG. 18, the transfer operation state machine 1604 remains in the IDLE state until it receives a go command from the master state machine 1602. Three different kinds of transfer operations are distinguished. In the simplest case, the operation to be performed is a fillMode operation in which the foreground color is simply copied to all of the destination pixels, requiring neither source bits or destination bits to be retrieved from memory. In a more complicated case, a copy operation is to be performed in which source bits are copied to the destination such that only the source bits are required. In the most general case, source pixels and destination pixels are combined in some fashion and written back to the destination. Both source pixels and destination pixels are required. Each of these case will be considered in the order described.

In fillMode, a FILL__1 state is first entered in which the transfer operation state machine 1604 waits until the destination write FIFO 303 is not full. Presumably, when the transfer operation state machine 1604 first receives the go command, the destination write FIFO 303 will not be full, although it may later become so. The transfer operation state machine 1604 then checks to see if it is done, and if not, checks to see whether the destination write FIFO 303 is full. Again, presumably the destination write FIFO 303 will not be full at first. The transfer operation state machine 1604 then enters a FILL__2 state in which an 8-byte transfer is performed.

Operation proceeds in the foregoing manner until the transfer operation state machine 1604 is done. Should the destination write FIFO 303 become full, the transfer operation state machine 1604 waits in the FILL__1 state until the destination write FIFO 303 is no longer full.

In the case of a copy operation, the transfer operation state machine 1604 first enters a COPY__1 state, a waiting state in which the transfer operation state machine 1604 waits under certain circumstances for two 8-byte words of source data to be available in the source FIFO 301 to achieve proper alignment of the source data with the destination data. If two 8-byte words of source data are required and are not yet available as determined in the following two decisions blocks, the transfer operation state machine 1604 remains in the COPY__1 state. Once two 8-byte words of source data has become available, the transfer operation state machine 1604 enters the COPY__3 state in which the two 8-byte words are appropriately combined. The transfer operation state machine 1604 then enters the COPY__3 state. If two 8-byte words of source data are not required, then the transfer operation state machine 1604 enters the COPY__3 state directly from the COPY__2 state.

The remainder of the state diagram for a copy operation is similar to that of the fill operation previously described. That is, a COPY__3 state is entered in which the transfer operation state machine 1604 waits until the destination write FIFO 303 is not full and there is data in the source FIFO 301. The transfer operation state machine 1604 then checks to see if it is done, and if not, checks to see whether the destination write FIFO 303 is full and there is data in the source FIFO 301. The transfer operation state machine 1604 then enters a COPY__4 state in which an 8-byte word transfer is performed.

Operation proceeds in the foregoing manner until the transfer operation state machine 1604 is done. Should the destination write FIFO 303 become full or the source FIFO 301 become empty, the transfer operation state machine 1604 waits in the COPY__3 state until the destination write FIFO 303 is no longer full and the source FIFO 301 is no longer empty.

The fillMode and copy operations represent special cases accorded special handling by the transfer operation state machine 1604. In the general case, source pixels and destination pixels are combined in some fashion and written back to the destination. Both source pixels and destination pixels are required. The state diagram for this case varies in only minor respects from that of the copy operation just described. The principle difference is that in the general case, instead of merely checking whether the source FIFO 301 has data, the transfer operation state machine 1604 checks whether both the source FIFO 301 and the destination read FIFO 302 have data.

Referring to FIG. 19, the memory address state machine 1603 remains in the IDLE state until it receives a go command from the master state machine 1602. It then enters a STALL state where it remains for so long as the buffers (i.e., the source FIFO 301, the destination read FIFO 302 and the destination write FIFO 303) are not ready. In the case of a read, the appropriate one of the source FIFO 301 and the destination read FIFO 302 must not be full. In the case of a write, the destination write FIFO 303 must not be empty.

While in the STALL state, the memory address state machine 1603 checks to see if it is done. If not, the memory address state machine 1603 checks to see if the buffers are ready. Assuming the buffers are ready, a REQ state is then entered in which the memory address state machine 1603 issues a memory request to the DRAM controller 408 or the VRAM controller 409. The memory address state machine 1603 remains in the STALL state until an acknowledge signal, or ack, is received from the DRAM controller 408 or the VRAM controller 409. The ack signals from the DRAM controller 408 and the VRAM controller 409 are ORed together and input to the graphics accelerator controller 1600 and, as the signal QDAACK, to the replicated state machines in the graphics accelerator datapath 300, thereby maintaining lockstep operation of the two sets of state machines.

Logic is incorporated into the memory address state machine 1603 to determine whether a burst access is possible as determined by the position of the current pixels within a transfer line, the fullness of the buffers, etc. If a burst access is not possible, the memory address state machine 1603 enters a SINGLE state in which the memory address state machine 1603 awaits a transfer acknowledge signal TA from the DRAM controller 408 or the VRAM controller 409. As with the ack signals from the DRAM controller 408 and the VRAM controller 409, the TA signals from the DRAM controller 408 and the VRAM controller 409 are ORed together and input to the graphics accelerator controller 1600 and, as the signal QDATA_, to the replicated state machines in the graphics accelerator datapath 300, thereby maintaining lockstep operation of the two sets of state machines.

In response to TA, an 8-byte word of data is then read or written as requested. The memory address state machine 1603 then checks again to see if it is done, and if not, returns to the STALL state.

If a burst access is possible, instead of entering the SINGLE state, the memory address state machine 1603 enters a succession of states BURST_1, BURST_2, BURST_3 and BURST_4. Each one of these states is comparable to the SINGLE state, in that the memory address state machine 1603 awaits the receipt of the TA signals and then reads or writes an 8-byte word of data. After the fourth 8-byte word of data has been read or written, the memory address state machine 1603 checks again to see if it is done, and if not, returns to the STALL state. When the memory address state machine 1603 is done, it returns to the IDLE state.

Operation becomes somewhat more complicated in the case of DRAM requests, as compared to VRAM requests. Recall that, in a preferred embodiment, DRAM is cacheable, whereas VRAM is not. In the case of DRAM requests therefore, issues of cache coherency arise. Cache coherency is maintained by operation of the bus master state machine 1601.

More particularly, DRAM requests must pass through the bus master state machine 1601 before being presented to the DRAM controller 408. The bus master state machine 1601 causes an address-only system bus transaction to be executed in order to 1) inform the data processor 103 of addresses being written in the main memory 109 so that the data processor 103 may, if necessary, invalidate a cache line within its level-one cache; and 2) delay the occurrence of reads from the main memory 109, if necessary, until the data processor 103 has had an opportunity to write back to the main memory 109 data that has been modified in the level-one cache.

Referring to FIG. 20, when the bus master state machine 1601 receives a request from the memory address state machine 1603 that is directed to the DRAM controller 408, the bus master state machine 1601 holds up the request and instead issues a request to the system bus arbiter 413 for access to the address bus 106. The system bus arbiter 413 respond with a grant to the bus master state machine 1601, whereupon the bus master state machine 1601 may then drive the DRAM address on the address bus 106. The bus master state machine 1601 first determines, according to configuration data, whether a "slow cycle" is to be performed. Where the system bus 104 is being run at a relatively high clock speed, a slow cycle may be used, in which the address lines are driven one cycle early, in order to satisfy set-up and hold times of other devices within the system. If a slow cycle is to be performed, the bus master state machine 1601 enters a DELAY state prior to entering a START state.

In the START state, the bus master state machine 1601 issues a transaction start signal TS_, signalling to the data processor 103 that the bus master state machine 1601 has begun driving an address on the address bus 106. The bus master state machine 1601 then enters a WAIT state in which it waits for an address acknowledge signal AACK_from the data processor 103.

Following the address acknowledge signal AACK from the data processor 103, the data processor 103 may then, within a specified period of time, issue an address retry signal ARTRY, indicating that the data processor 103 has dirty data to be written back to the main memory 109. The bus master state machine 1601 therefore, following receipt of the AACK signal, enters a RETRY state in which it waits for the possible occurrence of an ARTRY signal.

If an ARTRY signal is received, then the bus master state machine 1601 enters a REDO state in which the previous request is again made to the system bus arbiter 413. From the REDO state, the bus master state machine 1601 enters the IDLE state where it waits for a grant from the system bus arbiter 413. The previously-described operations are then repeated.

After one or more ARTRY signals have been received, the data processor 103 will presumably have gained access to the system bus 104 in order to write its dirty data back to the main memory 109 such that during a subsequent address-only transaction by the bus master state machine 1601, no ARTRY will be received. The bus master state machine 1601 then enters a PASS state.

Of course, if the data processor 103 at the outset does not have the corresponding data dirty in its cache, then no ARTRY signal will be returned the PASS state will be entered without having first transitioned through the REDO state.

In the PASS state, the request of the memory address state machine 1603 for the DRAM controller 408 is passed through the bus master state machine 1601 to the DRAM controller 408, and the bus master state machine 1601 waits for occurrence of the QDAACK signal signifying that the DRAM controller 408 is proceeding with the request. The bus master state machine 1601 then returns to the idle state until the memory address state machine 1603 next directs a memory request to the DRAM controller 408.

The close proximity of the graphics accelerator datapath 300 to the main memory 109 (as compared to the data processor 103, which is farther removed), allows memory cycles for the graphics accelerator datapath 300 to be accelerated. This feature may be seen in FIG. 21 and FIG. 22, illustrating a state diagram of a state machine used to implement the DRAM controller 408. For sake of completeness, a diagram of the entire state machine is shown. Only a portion of the state machine diagram is of particular relevance to the present invention, however. Referring to FIG. 21, when the DRAM controller 408 exits the IDLE state, it enters one of four different states depending on whether it has received a refresh request, a hardware graphics accelerator request from the memory address state machine 1603, a system read request, or a system write request. When a hardware graphics accelerator request has been received from the memory address state machine 1603, the DRAM controller 408 enters a QDA_ACK state. This portion of the state diagram will be described in detail.

In the QDA_ACK state, the DRAM controller 408 sends an acknowledge signal to the memory address state machine 1603. The DRAM controller 408 then determines whether the request is for a read or a write, causing one of two branches to be followed. If the request is for a read, a read branch is followed, which includes various read states QRD1 through QRD7. If the request is for a write, a write branch is followed, which includes various write states QWR1 through QWR7.

Very detailed timing requirements with respect to row address strobe (RAS) and column address strobe (CAS) signals must be met by the DRAM controller 408 in order to ensure correct operation of the main memory 109. The purpose of the various states QRD1 through QRD6 and QWR1 through QWR6 is to meet these timing requirements. Data is actually delivered in states QRD7 and QWR7. Furthermore, various timing parameters governing memory access are defined and stored in the configuration register file 401, including the following: RasDly, CasDly, CasDly1 and CasDly2. In accordance with one aspect of the present invention, these parameters are defined differently for memory accesses by the hardware graphics accelerator than for accesses by the system, taking advantage of the fact that data may be delivered to and from the graphics accelerator datapath 300 much more quickly than it can be delivered to or from the data processor 103. Depending on the particulars of the system, the memory timing parameters may be defined for hardware graphics accelerator accesses such that, on average, one clock cycle is save per hardware graphics accelerator accesses as compared to system accesses.

As described previously in relation to the memory address state machine 1603, accesses may be either single accesses or burst accesses. Therefore, after the state QRD7 in which data is delivered, the DRAM controller 408 checks to see whether the line continues, i.e., whether a further pixel in the same line is to be delivered. If so, the DRAM controller 408 returns to state QRD3. If not, then the DRAM controller 408 transitions to either a PIDLE state (page idle) if the access is a page-mode access, or to a precharge state PRCHG1. From the PRCHG1 state, the DRAM controller 408 either returns to the IDLE state or transitions to a state PRCHG2, in which the RAS line is precharged, depending on the state of a RAS precharge configuration bit. This bit is used to extend RAS high time to meet DRAM timing requirements at high bus clock speeds.

In the PIDLE state, RAS is held low in anticipation of a further access to the same page of memory. When a subsequent memory request occurs, the type of request is determined. If the request is a request from the hardware graphics accelerator, the DRAM controller 408 transitions to a state PQDA_ACK in which an acknowledge signal is returned to the memory address state machine 1603. Depending on whether the request is a read or a write request, the DRAM controller 408 the transitions to either the QRD4 state or the QWR3 state.

The present hardware graphics accelerator, by having access to both main memory and video memory, achieves greater acceleration than conventional hardware graphics accelerators as well as allowing greater code flexibility. Access to main memory is made possible by supporting transactions required to maintain cache coherency. Furthermore, the present hardware graphics accelerator is partitioned between two integrated circuit chips in such a way as to minimize to a large degree the number of signals that must be exchanged between the chips, thereby conserving valuable I/O pins.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A computer system comprising:
    a first bus;
    a second bus;
    a main memory connected to said second bus;
    a first processor connected to said first bus and having selective access to said main memory, said first processor including a cache memory in which information read by said first processor from said main memory is selectively cached, said first processor thereby accessing a multi-level memory hierarchy;
    a second processor connected to said first bus and said second bus, said second processor accessing said main memory via said second bus without detection by said first processor; and
    control circuitry for, prior to said second processor accessing said main memory via said second bus, initiating an address-only transaction on said first bus in accordance with a cache coherency protocol.

2. The apparatus of claim 1, wherein said first processor is a system processor and said first bus is a system bus, and wherein said memory is a main memory.

3. The apparatus of claim 2, wherein said second processor is a graphics processor and said second bus is a memory bus.

4. The apparatus of claim 3, further comprising a memory controller and a datapath circuit, said memory controller including said control circuitry and being connected to said datapath circuit, said datapath circuit including said graphics processor.

5. A computer system comprising:

a memory bus having a main memory connected thereto;

a system bus;

a memory controller for controlling access to said main memory;

a first processor having an associated cache memory and being connected to said system bus, said first processor accessing said main memory under the control of said memory controller;

a second processor connected to said system bus and said memory bus which accesses said main memory via said memory bus, without detection by said first processor; and means responsive to the accessing of said main memory by said second processor for maintaining the coherency of data stored in said cache memory with data stored in said main memory using an address-only transaction.

6. The computer system of claim 5, wherein said coherency maintaining means comprises a data path controller which selectively connects said system bus to said main memory, under control of said memory controller.

7. The computer system of claim 6, wherein said data path controller is responsive to a request for access to main memory by said second processor and sends a signal to said first processor to initiate a cache coherency operation.

* * * * *